United States Patent [19]

Alestig et al.

[11] 4,017,211

[45] Apr. 12, 1977

[54] RUNNER FOR HYDRODYNAMIC MACHINES

[75] Inventors: Ludvig Rune Ingvar Alestig; Göte Ivar Gustavsson, both of Kristinehamn, Sweden

[73] Assignee: Aktiebolaget Karlstads Mekaniska Werkstad, Karlstad, Sweden

[22] Filed: Sept. 17, 1975

[21] Appl. No.: 614,345

[52] U.S. Cl. .......................... 416/183; 416/201 R
[51] Int. Cl.² .......................................... F01D 1/10
[58] Field of Search ...... 416/183, 186, 201, 201 A; 415/143, 74, 141, 146

[56] References Cited

UNITED STATES PATENTS

| 700,365 | 5/1902 | Parsons | 416/201 |
|---|---|---|---|
| 1,836,860 | 12/1931 | Moody | 416/201 |
| 1,896,644 | 2/1933 | Pfau | 415/74 X |
| 1,910,216 | 5/1933 | Gill | 415/140 X |
| 2,986,218 | 5/1961 | Wagner et al. | 416/245 X |
| 3,026,085 | 3/1962 | Whippen et al. | 416/168 A X |
| 3,384,022 | 5/1968 | Oshima | 415/143 |
| 3,588,280 | 6/1971 | Yedidiah | 416/200 |

FOREIGN PATENTS OR APPLICATIONS

| 249,512 | 9/1962 | Australia | 416/168 A |
|---|---|---|---|
| 231,378 | 1/1964 | Austria | 415/140 |
| 235,701 | 9/1964 | Austria | 416/183 |
| 1,162,872 | 9/1958 | France | 416/183 |
| 799,013 | 7/1958 | United Kingdom | 415/143 |

*Primary Examiner*—Everette A. Powell, Jr.
*Attorney, Agent, or Firm*—Brumbaugh, Graves, Donohue & Raymond

[57] ABSTRACT

A runner for an hydrodynamic machine comprises fixed runner vanes mounted in a predominantly radially oriented part of an annular channel defined between a crown and a skirt ring, and a crown tip attached to the crown and defining with the skirt ring a predominantly axial portion of the channel. Fins attached to the crown tip deflect the flow leaving the runner vanes to eliminate essentially all vortex flow when the turbine operates above an optimum condition. The fins are substantially triangular in shape and are located with the apex portion nearest the runner vanes and the base portion remotest from the vanes. They are curved along their length, the apex being substantially aligned with the flow from the vanes and the base being aligned to deflect the flow in a direction generally with the axis of rotation of the runner.

4 Claims, 5 Drawing Figures

U.S. Patent  April 12, 1977  4,017,211
FIG. 1
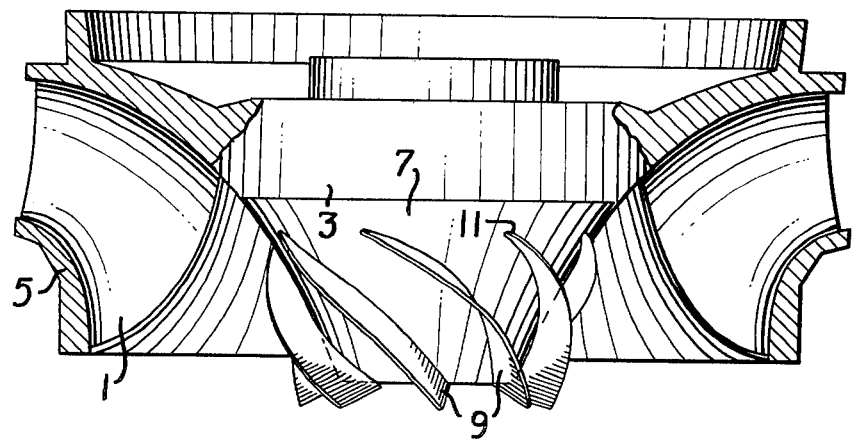
FIG. 2
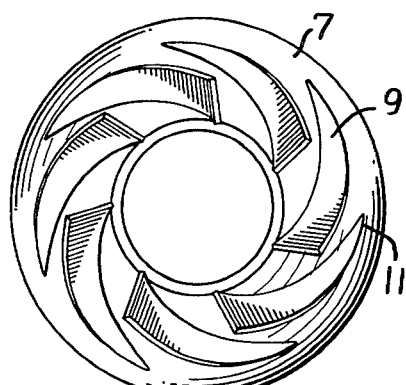
FIG. 4
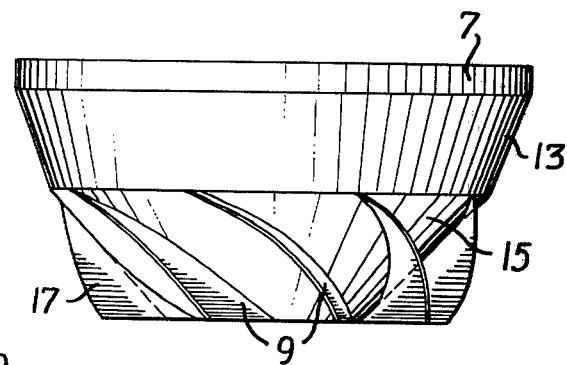
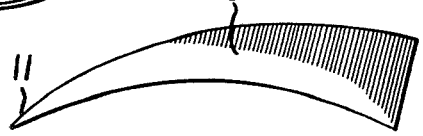
FIG. 3
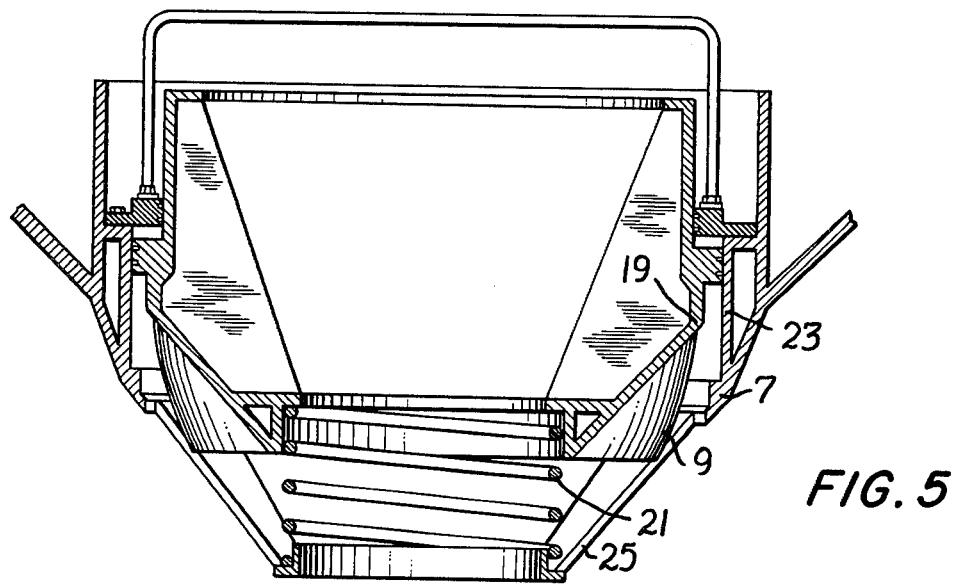
FIG. 5

RUNNER FOR HYDRODYNAMIC MACHINES

BACKGROUND OF THE INVENTION

A runner for a Francis turbine or a pump-turbine is generally designed so that it operates smoothly and efficiently for an optimum operating condition defined by predetermined values of head, flow, speed and runner diameter. At optimum or near-optimum operating conditions of a Francis turbine or a pump-turbine operated as a turbine, the highest efficiencies will be obtained, and the water will leave the runner without rotation or with only slight rotation. At operating conditions deviating significantly from the optimum condition, the efficiencies will be lower, and certain undesirable disturbances, e.g., pressure pulsations, output fluctuations and an increased sound level, will occur. Thus, it is undesirable, and in some cases may be impossible, to operate the turbine at operating conditions deviating substantially from the optimum conditions because the disturbances can become severe enough seriously to damage the turbine or equipment associated with it.

An important cause of the disturbances that occur under conditions deviating from the design conditions is the fact that the water leaves the runner with rotation, i.e., a circumferential component of flow or a vortex flow. At optimum operating conditions, the rotation of the water is prevented by designing the runner such that the peripheral velocity at any point on the trailing edge of a runner vane combines with the velocity of flow relative to the rotating runner in such a manner that the resulting absolute velocity of the water is directed substantially axially. However, when the operating conditions deviate from the optimum condition, the velocity of the water relative to the vanes is altered, thus resulting in an absolute velocity of the water having a circumferential component.

More specifically, when the turbine load exceeds the optimum condition, and is accommodated such as by increasing the head on the runner or opening the wicket gates to increase flow, the velocity of the water relative to the vanes is increased, thereby resulting in an absolute water velocity having a component in the direction opposite to that of the peripheral velocity of rotation of the runner and forming a vortex which rotates in a direction opposite to that of the runner. When the turbine load is being optimum or "design", the velocity of the water relative to the vanes is reduced, thereby resulting in an absolute velocity having a component in the direction of the peripheral velocity of rotation of the runner and forming a vortex (a circumferential flow) which rotates in the direction of rotation of the runner. If the rotation is severe, the pressure at the center of the rotating water mass, i.e., the vortex, will be so low that cavitation occurs. Moreover, the vortex is not coaxial to the axis of rotation of the runner but makes a precessional movement about it.

To obtain a range of operating conditions as large as possible with a minimum of disturbance, most of the known solutions have concentrated on the design of the runners, especially the shape of the runner vanes. British Patent No. 799,013 describes another approach, namely to decrease the intensity of the vortex by providing fins positioned on the portion of a crown tip furthest from the runner vanes. Because of their relatively small radial diameter and their interconnection at the center of the shaft of the crown tip, the fins described and illustrated in the British patent do not significantly improve the flow stability and efficiency of the runner.

SUMMARY OF THE INVENTION

There is provided, in accordance with the present invention, an improved runner for Francis turbines and pump-turbines which substantially eliminates a vortex formed during operating conditions in excess of an optimum condition, thereby increasing the disturbance-free operating range of the turbine. More particularly, the improvement involves the provision of fins mounted on a crown tip of the runner, the fins being substantially triangular in shape and independently spaced-apart from one another. Each fin is positioned such that the apex portion is nearest the runner vanes and is substantially aligned with the direction of flow of water leaving the runner vanes, and is curved in profile to deflect or turn the flow of water leaving the runner vanes into a substantially axial direction. Preferably, the fins extend along substantially the entire length of the crown tip.

In one embodiment, the crown tip comprises a first truncated cone portion joined to the crown and a second truncated cone portion joined to the first portion, the second truncated cone portion having a greater cone angle than the first. In this embodiment, the fins are mounted on the second truncated cone portion, the free, radially outward edges of the fins defining a conical surface having a cone angle equal to that of the first cone portion of the crown tip and contiguous to the first portion.

In some cases, it is desirable to make the crown tip in two parts, one of which is received within the other and mounted for axial movement. The fins are attached to the inner member and in one position of the inner member project out through slots in the outer member and in another position are retracted within the outer member.

For a better understanding of the present invention, reference may be made to the following description of exemplary embodiments of the invention, taken in conjunction with the figures of the drawing.

DESCRIPTION OF THE DRAWINGS

FIG. 1 is an elevational view of one embodiment of a runner, portions being broken away in section;

FIG. 2 shows a crown tip of the runner of FIG. 1 from below;

FIG. 3 shows, in an enlarged scale compared to FIGS. 1 and 2, the shape of a fin as a plane view;

FIG. 4 is an elevational view of an alternative embodiment of the crown tip; and FIG. 5 is an axial, cross-sectional view of an alternative embodiment with fins mounted for retraction.

DESCRIPTION OF EXEMPLARY EMBODIMENTS

FIG. 1 shows a runner suitable for a Francis turbine having fixed runner vanes 1 mounted in a predominantly radially-oriented portion of a flow channel defined by a crown 3 and a skirt ring 5 that is coaxial with the crown 3. A crown tip 7 attached to the crown 3 defines with the skirt ring 5 a predominantly axial portion of the flow channel. Fins 9 are welded or otherwise mounted on the crown tip 7 and are shaped to turn or deflect the flow of water leaving the runner vanes. The fins 9 are circumferentially spaced-apart from one another, as shown in FIG. 2, and are essentially triangular in plane or flattened view, as shown in FIG. 3. Each fin 9 is oriented with its apex end 11 substantially aligned with the direction of flow of water leaving the runner vanes 1 and its base end (furthest from the runner) aligned to deflect the flow in a direction generally with the axial axis of rotation of the runner. The fins, therefore, deflect the flow of water into a substantially axial direction of the runner, thus eliminating virtually all vortex flow from the runner when the turbine operates above an optimum condition and holding vortex flow to a minimum under optimum conditions.

The curvature of the fins 9 is calculated so that, at a turbine load in excess of the optimum operating condition of the turbine, the central part of the flow downstream of the crown tip 7 is virtually free from rotation, and, at optimum or design load, the central part of the flow downstream of the crown tip 7 has only such a slight rotation in the direction of rotation of the runner that virtually no disturbances occur.

In an alternative embodiment illustrated in FIG. 4, the crown tip 7 comprises an upper truncated cone portion 13 and a lower truncated cone portion 15 attached to the upper cone portion 13 and having a greater cone angle than that of the upper portion 13. The fins 9 are attached to the lower truncated cone portion 15, and their outer or free edges define generally a conical surface contiguous to that of the upper cone portion and having a cone angle substantially the same as that of the upper cone portion.

In the embodiment of FIG. 5, the fins 9 can be brought to different positions in relation to the surface of the crown tip 7, between a fully protruding operating position and a retracted non-operating position. This embodiment is particularly desirable for use with pump-turbines in which, in order to avoid disturbances, the fins 9 are designed to be non-active when the turbine is operating as a pump. The fins 9 are attached to an inner member 19 of the crown tip 7 which is urged into an extreme upper position, as shown in FIG. 5, in an hydraulic cylinder 23 by a spring 21. The member 19 is axially displaceable inside an outer member of the crown tip 7 between two extreme positions, and the outer member of the crown tip 7 has slots 25 through which the fins 9 are protrudable to varying extents.

When the member 19 rests in the extreme upper position, the fins 9 are retracted within the outer member of the crown tip 7. However, when the member 19 rests in an extreme lower position (not shown), the fins 9 protrude to a maximum extent from the surface of the outer member of the crown tip 7 through the slots 25. The member 19 may also be brought to rest in positions between the extreme upper and lower positions, whereby the fins 9 will only partially protrude beyong the surface of the outer member of the crown tip 7.

We claim:

1. In a runner for a hydrodynamic machine having a crown, a skirt ring located coaxially with and spaced outwardly from the crown to define with the crown a generally radially oriented first portion of an annular flow channel, a crown tip joined to the crown, extending coaxially within the skirt ring, forming a continuation of the crown and defining with the skirt ring a generally axially-oriented second portion of the annular flow channel, and a multiplicity of circumferentially spaced-apart, fixed runner vanes mounted in the channel and extending between the crown and the skirt ring, the improvement comprising a multiplicity of fins attached to and extending generally radially from the crown tip and adapted to modify the direction of flow leaving the runner vanes to provide substantially axial flow from the runner, the fins being spaced apert circumferentially, and each fin being substantially triangular in shape, as viewed in plan and having dimensions radially of the annular flow channel at all locations thereon that are substantially less than the radial dimensions of the flow channel at such locations such that flow through the flow channel is not substantially obstructed, the apex portion of each fin being in proximity to the runner vanes and the base portion of each fin being remote from the vanes and substantially spaced radially from the axis of rotation of the runner, the apex end of the apex portion of each fin being aligned with the direction of flow through the channel as it leaves the vanes and each fin being curved to deflect the flow of water progressively to turn the flow of water leaving the vanes substantially to eliminate circumferential flow.

2. A runner according to claim 1, wherein the crown tip comprises a first truncated cone portion joined to the crown and a second truncated cone portion joined to the first truncated cone portion, the second truncated cone portion having a greater cone angle than the first truncated cone portion, and wherein the fins are attached to the second truncated cone portion and the free outer edges of the fins define generally a conical surface having a cone angle substantially equal to the cone angle of the first truncated cone portion and contiguous to the first truncated cone portion.

3. A runner according to claim 1, wherein the crown tip includes a first hollow member having a multiplicity of slots and a second member received within the first member and mounted for movement coaxially relative to the first member, and wherein the fins are mounted on the second member and project through the slots in the first member in one axial position of the second member relative to the first member and retract within the slots in a second position of the second member.

4. A runner according to claim 1, wherein each fin extends along substantially the entire axial extent of the crown tip from a location thereon closely adjacent the crown and the runner vanes to a location at substantially the free extremity of the crown tip.

* * * * *